US007252848B2

(12) United States Patent
Gelin

(10) Patent No.: US 7,252,848 B2
(45) Date of Patent: Aug. 7, 2007

(54) FLAVORED OIL-IN-WATER EMULSIONS FOR FOOD APPLICATIONS

(75) Inventor: Jean-Luc Gelin, Divonne-les-Bains (FR)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 10/964,396

(22) Filed: Oct. 13, 2004

(65) Prior Publication Data

US 2005/0048181 A1    Mar. 3, 2005

Related U.S. Application Data

(63) Continuation of application No. PCT/IB03/01882, filed on May 7, 2003.

(30) Foreign Application Priority Data

May 16, 2002    (WO) .............. PCT/IB02/01763

(51) Int. Cl.
  A23L 3/40    (2006.01)
  A23L 3/46    (2006.01)
  A23D 7/00    (2006.01)

(52) U.S. Cl. .................. 426/443; 426/602

(58) Field of Classification Search .......... None
See application file for complete search history.

(56) References Cited

U.S. PATENT DOCUMENTS

| | | | |
|---|---|---|---|
| 3,892,873 A * | 7/1975 | Kolen et al. ............... 426/602 |
| 4,273,790 A * | 6/1981 | Bosco et al. ............... 426/335 |
| 5,202,146 A * | 4/1993 | Singer et al. ............... 426/613 |
| 5,695,802 A | 12/1997 | Van Den Ouweland et al. ............... 426/533 |
| 6,083,540 A * | 7/2000 | Christensen et al. ......... 426/50 |
| 6,221,419 B1 * | 4/2001 | Gerrish ................ 426/577 |
| 6,287,623 B1 * | 9/2001 | Nakayama et al. ........ 426/584 |
| 6,475,539 B1 * | 11/2002 | DeWille et al. ............... 426/72 |
| 2002/0004089 A1 * | 1/2002 | Beyer ................ 426/138 |
| 2002/0009518 A1 | 1/2002 | Soe ................ 426/33 |
| 2003/0099761 A1 * | 5/2003 | Jost ................ 426/656 |

FOREIGN PATENT DOCUMENTS

| EP | 0 351 128 A1 | 1/1990 |
|---|---|---|
| EP | 0 596 546 A1 | 5/1994 |
| WO | WO 90/00354 A1 | 1/1990 |

OTHER PUBLICATIONS

Ashurst, P. R., 1995. Food Flavorings, 2nd edition, Blackie Academic & Professional, New York, p. 245, 249.*
Wong, Noble P, editor. 1988. Fundamentals of Dairy Chemistry, 3rd Edition, Van Nostrand Reinhold Co, New York, p. 21..*
U. Einhorn-Stoll et al., "Interactions of Whey Proteins with Different Pectins in O/W Emulsions" (Short Communication), Nahrung, vol. 42, No. 3/4, pp. 248-249 (1998).
C.I. Onwulata et al., "Properties of Reduced-Fat Composites of Sugar Alcohols, Whey Isolates and Pectin," Journal of Food Lipids, vol. 7, No. 1, pp. 39-50 (2000).
U. Einhorn-Stoll et al., "Modified Pectins in Whey Protein Emulsions," Nahrung, vol. 40, No. 2, pp. 60-67 (1996).
S. Mishra et al., "Functional Improvement of Whey Protein Concentrate on Interaction with Pectin," Food Hydrocolloids, vol. 15, pp. 9-15 (2001).

* cited by examiner

*Primary Examiner*—Carolyn Paden
(74) *Attorney, Agent, or Firm*—Winston & Strawn LLP

(57) ABSTRACT

The invention concerns an acidic butter oil-in-water emulsion of a lipophilic substance capable of imparting, improving or modifying the flavor properties of a composition to which it is added. These emulsions are particularly stable due to the presence of a combination of high methoxyl pectin and whey protein in their continuous phase, which combination acts as an emulsifier and a stabilizer of these emulsions. These systems can be advantageously used for the flavoring of various food applications, in particular for dairy products. The emulsion can be used as is or can be dried to a powder prior to such use.

6 Claims, No Drawings

FLAVORED OIL-IN-WATER EMULSIONS FOR FOOD APPLICATIONS

CROSS-REFERENCE TO RELATED APPLICATIONS

This application is a continuation of International application no. PCT/IB03/01882 filed May 7, 2003, the entire content of which is expressly incorporated herein by reference thereto.

TECHNICAL FIELD

The present invention relates to the flavor industry. It concerns more particularly a dairy emulsion, or in other words a butter oil-in-water emulsion of a lipophilic substance capable of imparting, improving or modifying the flavor properties of a composition. The emulsion of the present invention constitutes a stable and effective release system for such substances, and can thus be incorporated as such in a dairy or other food product or be further processed during an encapsulation process to transform it into a solid form. The dispersed system of the invention is characterized by the presence in its continuous phase of a combination of whey protein and high methoxyl (HM) pectin, which combination renders the emulsion very stable and particularly appropriate for its use as a delivery system for a flavor or another lipophilic substance such as an animal or vegetable fat hydrolysate.

BACKGROUND

Oil-in-water emulsions have been widely used as flavor delivery systems in the food industry, especially in the area of soft-drinks and beverages. However, their limited thermodynamic stability, which means that they always tend to separate into their two original liquid phases on standing, represents the biggest drawback in application and has the consequence that such delivery systems always need to be improved. A solution provided by the prior art consists in using bulk thickeners such as for instance vegetable gums or seaweed extracts in the continuous phase of the emulsion. However, this alternative always increases the viscosity of the emulsified system which may be a limiting factor for a further use of the emulsions in such applications.

The prior art also reports the existence of many oil-in-water systems suitable for the preparation of dairy or dairy-like products. In these systems, the discontinuous phase generally consists of both oil and a fat. The latter include either animal oils or fats, such as milk fat or butter oil and vegetable fats and oils, which are known per se in the food industry. Most often, the aim pursued in preparing such emulsions is to provide products which, as for the dairy-like products to be prepared therefrom, show the greatest possible similarity with natural milk. These systems, together with milk, wholly, or partly skimmed or reconstituted milk, can be processed to dairy or dairy-like products. In these emulsions, a whey protein ingredient is used as it is known to have good emulsifying properties.

Furthermore, it is reported in an article from Einhorn-Stoll et al. that polysaccharides play as well an important role in emulsion stabilization. More particularly, the authors report in two articles, namely in Nahrung 40 (1996), Nr. 2, p. 60-67 and Nahrung 42 (1998) Nr. 314, p. 248 and 249, a system in the form of a sunflower oil-in-water emulsion. They study the influence of the addition of high molecular weight polysaccharides, namely HM pectin, low methoxyl (LM) pectin and amidated pectin in whey protein emulsions. Einhorn-Stoll et al. conclude that, due to the formation of complexes between the protein and the free carboxylic groups of the pectin, LM pectin (having a low degree of esterification and therefore many free carboxylic groups) is more adapted than HM pectin for stabilizing these emulsions. In other words, the content of this document guides towards the use of LM pectin for stabilizing whey protein emulsions.

However, the experimental results provided by the above-mentioned articles are, as stated by the authors themselves, very different and inhomogeneous. Besides, the emulsions disclosed therein have a dispersed phase consisting essentially of a vegetable oil.

Now, the system of the present invention is different in several points from that disclosed in this prior art. In fact, the invention provides a delivery system for a lipophilic, optionally volatile substance, typically a flavor, which needs to be stabilized in a system such as an emulsion in order to be effectively released in a final application. Therefore, contrary to the emulsions described in the above-mentioned prior art, the dispersed phase of the system of the invention comprises, together with the oil, a substance capable of modifying the organoleptic properties of a composition to which it is added, typically a flavor ingredient or composition. Furthermore, the oil on which is based the dispersed phase is not from a vegetable origin, but from an animal origin.

Therefore, given the composition differences existing between the system object of the present invention and that disclosed in the prior art, in particular by Einhorn-Stoll et al., it was basically not very likely that the results reported by this document could be used in a system such as that of the invention. However, even if one had tried to use the results taught by the mentioned articles, this person would have been guided to use LM pectin as an emulsifier of a system containing whey protein.

SUMMARY OF THE INVENTION

Now, conversely, it has been discovered in an unexpected manner considering the results from the prior art, that in the systems of the present invention, the combination of whey protein and HM pectin provides a very efficient stabilizing system of an emulsion, the dispersed phase of which primarily includes a mixture of butter oil with a lipophilic substance capable of modifying the organoleptic properties of a composition. On the other hand, as shown in the comparative example below, LM pectin is not at all appropriate for our purpose.

The present invention relates to a novel butter oil-in-water emulsion of a lipophilic substance such as a flavor and/or an animal or vegetable fat hydrolysate. Contrary to what has been described in the prior art directed to dairy emulsions based on the use of whey protein, the dispersed system of the present invention constitutes a delivery system capable of releasing in an application a lipophilic substance having the function of imparting, improving or modifying the organoleptic properties of the composition to which it is added. For instance, volatile or labile substances are advantageously prepared in the form of emulsions in order to be less the object of undesirable interactions with the environment such as oxidation in the case of flavors. On the other hand, other ingredients may be employed in the form of emulsions in order to improve their use in food applications, as is the case for animal or vegetable fat hydrolysate. Thus, improvements in these type products are desired.

DETAILED DESCRIPTION OF THE PREFERRED EMBODIMENTS

The invention specifically relates to an acidic butter oil-in-water emulsion of a lipophilic substance capable of imparting, improving or modifying the flavor properties of a composition to which it is added, the emulsion comprising 70 to 95%, preferably from 80 to 90% by weight relative to the total weight of the emulsion of a continuous aqueous phase and 5 to 30%, preferably from 10 to 20% by weight relative to the total weight of the emulsion of a dispersed phase. This emulsion is characterized by the fact that the aqueous continuous phase comprises a combination of HM pectin and whey protein.

The lipophilic active substance present in the dispersed phase of the emulsion is preferably a flavor and/or a vegetable or animal fat hydrolysate.

The use in its continuous phase of a combination of whey protein and HM pectin overcomes the drawbacks of the prior art and provides, in a totally unexpected manner given the results reported by Einhorn-Stoll, excellent results for a butter oil-in-water emulsion, while LM pectin is totally unsuitable for the purpose of the invention.

In an unexpected manner, the specific combination of whey protein and HM pectin used in the continuous phase of the invention provides an advantageous emulsification and stabilization of the lipophilic substance contained in the dispersed phase of the emulsion, thus allowing both stability over the shelf life (several months at storage temperature, typically between 10 and 25° C.) and a proper release of such active ingredient, while limiting the viscosity increase of the system.

Therefore, the emulsion of the invention constitutes an effective delivery system for a flavor and/or for an animal or vegetable fat hydrolysate, which emulsion can be used as such in several dairy or other food applications, or be further processed during an encapsulation process in order to have it in a solid state.

In a first embodiment, the emulsion of the invention constitutes a delivery system for a flavor compound or composition. As it is well known in the art, taste and aroma are greatly influenced by volatile components present in such products. However, because of the volatility of these compounds, it is not easy to ensure that the predetermined critical amount of each flavor components be present in the food and products as they reach the consumer. Losses of volatile components might occur prior to incorporation into the food product and thus produce undesirable variations in the taste and aroma of the products as perceived by the consumer. On the other hand, losses of volatile components might occur through the conversion of certain flavor materials into unwanted less desirable or tasteless chemicals by their interaction with reagents present in the environment such as oxygen. The emulsion of the invention advantageously overcomes these kinds of problems. In fact, it has been established that both polymer types used in the continuous phase have interesting functional properties with regard to both emulsion stabilization and flavor binding. Due to its improved stability, the system of the invention allows a proper release of the flavor only when required.

In another embodiment of the invention, the dispersed phase of the emulsion comprises, together with the butter oil, at least one animal or vegetable fat hydrolysate. The latter lipophilic substances are used to improve the impact and mouthfeel of flavoring compositions, in particular in the case of dairy products which have a low fat content. In fact, flavoring foods which have a low content in fats, i.e. the so-called "light" or low-calorie foods, present particular difficulties. Whereas it is possible to compensate more or less adequately the gustative or taste notes characteristic of the fats, through addition of appropriate flavoring ingredients, there remains the problem related to the difficulty in reconstituting or reproducing, in the light or defatted products, the feeling in the mouth or "mouthfeel" and the creamy-type consistency or texture which are precisely imparted by the fat materials. This problem is particularly acute in dairy products. Now, animal or vegetable fat hydrolysates can solve this problem. In fact, under controlled hydrolysis, fat material of animal or vegetable origin (mainly triglycerides) are transformed into several hydrolyzed fractions (mono-and diglycerides, fatty acids) used to prepare flavoring compositions. The properties of these hydrolysates allow to improve the mouthfeel of flavoring compositions for use in defatted or low-fat products. However, due to their lipophilic character, these hydrolyzed fractions cannot be used per se in an application in which the continuous phase is watery because they will phase separate from this watery phase. The incorporation of these hydrolyzed fractions inside the dispersed oil phase of the novel emulsion described therein advantageously overcomes this drawback.

The liquid acidic emulsions of the invention can be advantageously used to impart, improve or modify the organoleptic properties of a dairy product or another foodstuff to which they are added as such, or as further processed.

Advantageously, the system of the invention presents a limited viscosity compatible with a further use in application. Typically the viscosity of the emulsions prepared varies between 10 and 1000 mPa.s and in particular embodiments, between 30 and 200 mPa.s, as measured by a co-axial viscosimeter at a rotation speed of 50 rad/s and 20° C.

Furthermore, the emulsion subject of the invention have an average droplet size (Sauter diameter) typically in the range of 0.20 to 2 µm and in particular embodiments, in the range of 0.40 to 0.60 µm (as measured immediately after high pressure homogenization by a laser-light scattering technique). Advantageously, this average oil droplet size does not change significantly during shelf life.

The emulsions object of the present invention have an acidic pH, preferably below 4.5 at a temperature comprised between 20 and 27° C. The pH at which most proteins are least soluble is termed the isoelectric point of the protein, i.e. the pH at which the molecule has no net electric charge. Under these conditions, there is no electrostatic repulsion between neighboring protein molecules and they tend to form aggregates and to precipitate. However, if pH values are above or below the isoelectric point, all the protein molecules have a net charge of the same sign. They therefore repel each other, preventing the aggregation of single molecule. The emulsions of the invention are prepared at a pH below the isoelectric point of whey proteins, namely between 3 and 5.3 and in particular examples between 3.8 and 4.5, where proteins have a net electropositive charge. At these pH values, whey proteins have the remarkable feature to remain highly soluble and do not aggregate, while maintaining a high interfacial activity. Usual ingredients known from a skilled person in the art can be used to adjust the pH of the emulsions to a suitable value.

The continuous phase of the dispersed system of the invention is an aqueous phase based on water and one or more co-solvent such as propylene glycol or ethyl alcohol which act as preservative agents. Acidity regulation agents, if needed, are also part of the aqueous phase. This phase is characterized by the presence of a combination of whey protein and HM pectin.

This novel combination in a butter oil-in-water emulsion proved to provide stabilized flavored oil-in-water emulsions.

Pectins are polymers of galacturonic acid, more or less esterified with methoxyl groups. Native pectins are highly methoxylated. Chemical modification may be applied to obtain low pectins. LM pectins are of two types, namely amidated LM pectin and non amidated LM pectin (also called conventional), according to the chemical de-esterification process either performed in alkaline or acid conditions for amidated and non amidated LM pectin respectively. However, as shown in the comparative example below, the HM pectins are the only suitable pectins for our purpose.

As regards the whey protein used in the invention, the variety of available products is very wide. In the invention, one can use for instance whey powder containing c.a. 10% protein. Other ingredients based on whey protein may be used as well, such as whey protein concentrates, whey protein isolates or isolated proteins like pure β-lactoglobulin.

Typically the emulsion according to the invention comprises from 0.10 to 4% and preferably from 0.25 to 2% by weight relative to the total weight of the emulsion of HM pectin and from 0.2 to 10%, preferably from 0.5 to 2.5% by weight relative to the total weight of the emulsion of whey protein.

The emulsion further comprises from 5 to 30%, preferably from 10 to 20% of a dispersed phase based on butter oil and comprising a flavor oil or an animal or vegetable fat hydrolysate.

What is meant here by "butter oil" is either a native butter oil or anhydrous milk fat i.e. a mixture of saturated fatty acids, polyunsaturated fatty acid and monounsaturated fatty acids, or any fatty acid composition or fraction deriving from the fractionation of a native butter oil.

The flavor oil and/or animal or vegetable fat hydrolysate is present in proportions comprised between 0.01 and 20% by weight relative to the total weight of the composition. In a particular embodiment, the lipophilic substance is present in an amount comprised between 0.5 and 10% by weight of the composition.

The terms flavor oil as used herein are deemed to define a variety of flavor materials of both natural and synthetic origin; they include single compounds as well as mixtures. The emulsion of the invention may include volatile or labile components. Specific examples of such components may be found in the current literature, e.g. in Perfume and Flavour Chemicals by S. Arctander, Montclair N.J. (USA); Fenaroli's Handbook of Flavor Ingredients, CRC Press or Synthetic Food Adjuncts by M. B. Jacobs, van Nostrand Co., Inc.

Natural extracts can also be encapsulated into the systems of the invention; these include e.g. citrus fruit extracts such as lemon, orange, lime, grapefruit or mandarin oil, or coffee, tea, mint or vanilla.

In another embodiment, the discontinuous phase of the invention includes, together with the butter oil, a hydrolysate of vegetable or animal fat, preferably a glyceridic fraction of a butter hydrolysate, optionally in combination with other substances susceptible of improving the impact and mouthfeel of the composition and of the dairy product wherein the composition is incorporated. Examples of such glyceridic fractions extracted from butter oil after hydrolysis include, for example, butyric acid, decanoic acid, hexanoic acid, octanoic acid, dec-9-enoic acid, 4-methylnonanoic acid, 4-methyloctanoic acid, 2-methylheptanoic acid, oleic acid, hexadecanoic acid, pentadecanoic acid, 2-methylhexanoic acid, 2-methylbutanoic acid, heptadecanol, hexadecanol, 2-tetradecanone or mixtures thereof. The latter, and in particular digylceride fractions possess organoleptic properties commonly associated with fats and, as a result, can be advantageously used to improve the mouthfeel of the products into which they are incorporated. Other particular examples of these fractions and processes for their preparation are disclosed in U.S. Pat. No. 5,695,802, the contents of which is hereby included by reference. The system of the invention therefore provides an advantageous delivery system for such ingredients, as it allows to flavor and improve the mouthfeel of dairy products, in particular low-fat products, while avoiding any phase separation as mentioned above.

Apart from a flavor and/or an animal or vegetable fat hydrolysate, the dispersed phase can also include other oil soluble substances such as oil soluble colorants, or yet substances like vitamins or other functional ingredients such as carotenoids for instance. In other words, the dispersed phase of the emulsion of the invention acts as a watery carrier of oil-soluble active ingredients which can advantageously be combined with a flavor and/or an animal or vegetable fat hydrolysate.

The emulsions of the invention may be used as such for imparting, improving or modifying the flavor properties of a foodstuff or beverage. In other words, they may be employed as adjuvants in a variety of dairy products such as dairy drinks (flavored milks, whey drinks, directly acidified milk drinks, yoghurt drinks), yoghurts (cup-set style, stirred style with or without fruit), frozen desserts (ice creams, sherbets, sorbets, frozen yoghurts, water ices), sour creams (low-fat type, fat-free types), quark (quark with fruits). In addition, such emulsions can be used in non dairy applications like preparations, salad dressings, mayonnaises, sauces, soy products (soy beverages, fermented soy products).

The proportions in which the emulsion is added to a dairy product or another foodstuff vary in accordance with the nature of the product to be flavored and the particular organoleptic effect it is desired to achieve. The expert in the art knows by experience how to assess this parameter for obtaining a well balanced and harmonious aroma in a given food or beverage. Typically, the emulsions of the invention can be added in an amount comprised between 0.05% weight/weight and 2% weight/weight to the final composition to be flavored.

The dispersed systems of the invention are prepared according to usual techniques well known in the field of emulsions and which are totally mastered by a skilled person in the art. More details will be given in the examples below.

In a particular embodiment, the dispersed system of the invention may be further processed before being added to the final application. In particular, the emulsions of the invention may be dried by conventional spray-drying, or yet, may constitute a starting product for an extrusion process and be further incorporated in dairy applications or other food products. Such post-processings allow the formation of a triple barrier film, namely oil droplet/interfacial film/ glassy matrix, advantageously employed to provide a delayed flavor release.

Conventional spray-drying techniques are perfectly well documented in the prior art and therefore constitute general knowledge for a skilled person in the art. For instance, Spray-Drying Handbook, $4^{th}$ ed., K. Masters, (1985) is one of the reference books on the subject matter.

On the other hand, as mentioned above, the emulsion of the invention can also be subjected to an extrusion process. Here again, the prior art describes to a large extend principles of extrusion methods. Typical conditions used for such a process are for instance described in U.S. Pat. No. 3,707,137, the contents of which, as regards experimental conditions, is hereby included by reference. Other documents describing improved extrusion techniques such as PCT application no. WO 01/17372 are also part of the general knowledge of a person skilled in the art and can be considered for the purpose of the invention

EXAMPLES

The invention will be now illustrated in the following examples wherein the temperatures are indicated in degrees Celsius and the abbreviations have the usual meaning in the art.

Example 1

Preparation of a Liquid Acidic Strawberry Flavored Butter Oil-in-Water Emulsion

Composition of the Emulsion:

| Ingredients | Parts by weight |
| --- | --- |
| Butter oil | 13.0 |
| Strawberry flavor 52312 A[1] | 1.0 |
| Water | 70.0 |
| Whey powder[2] | 2.0 |
| HM pectin[3] | 1.0 |
| Propylene glycol | 13.0 |
| Total | 100.0 |

[1]origin: Firmenich SA, Geneva, Switzerland
[2]origin: France Lactosérum
[3]origin: Hercules Processing of the Emulsion:

1. Preparation of the Oil Phase
    The butter oil was melted in a water bath at 50° and then mixed with the strawberry flavor and kept melted at 50° before pre-emulsification.

2. Preparation of the Water Phase
    On the other hand, a preblend of HM pectin and whey powder was prepared. The obtained powder was then dispersed in water and stirred using an Ultra-Turax apparatus (T50 basic, speed 3, mixing tool S 50 N, room temperature, 15 min) before being hydrated during 15 min without stirring.

3. Pre-Emulsification (Premixing)
    The oil phase was added to the water phase and stirred for 5 min under an Ultra-Turax apparatus (T50 basic, speed 3, mixing tool S 50 N). Propylene glycol was added and the mixture was stirred for another 5 min.

4. High Pressure Homogenization (Emulsification)
    High pressure two stages homogenization was carried out (APV homogenizer Lab 100, 1 pass $3 \times 10^7$ Pa: pressure ratio first stage/second stage=$2.5 \times 10^7$ Pa /$0.5 \times 10^7$ Pa).

Characterization of the Emulsion:
    Average oil droplet size: the average surface/volume oil droplet size (also called $d_{(3,2)}$ or Sauter diameter) measured immediately after homogenization by laser light scattering technique (Malvern MasterSizer MS17, Malvern Instruments) was found to be 0.75 μm.

Viscosity: after homogenization, the emulsion had an absolute viscosity of 54 mPa.s (Viscosimeter AR 100, room temperature, 50 rad/s).

Aspect: no phase separation was observed after one month.

Example 2

Comparative Example Between the Combination of Whey Protein with HM Pectin and the Combination of Whey Protein with LM Pectin Composition of the Emulsion:

| Ingredients | Parts by weight |
| --- | --- |
| Butter oil | 13.0 |
| Strawberry flavor 52312 A[1] | 2.0 |
| Water | 69.0 |
| Whey powder[2] | 2.0 |
| Pectin[3] | 1.0 |
| Propylene glycol | 13.0 |
| Total | 100.0 |

[1]origin: Firmenich SA, Geneva, Switzerland
[2]origin: France Lactosérum
[3]origin: see Table 1 below Processing of the Emulsion:

1. Preparation of the Oil Phase
    The butter oil was melted in a water bath at 50° and then mixed with the strawberry flavor and kept melted at 50° before pre-emulsification.

2. Preparation of the Water Phase
    On the other hand, a preblend of pectin and whey powder was prepared. The obtained powder was then dispersed in water and stirred using an Ultra-Turax apparatus (T50 basic, speed 3, mixing tool S 50 N, room temperature, 15 min) before being hydrated during 15 min without stirring.

3. Pre-Emulsification (Premixing)
    The oil phase was added to the water phase and stirred for 5 min under an Ultra-Turax apparatus (T50 basic, speed 3, mixing tool S 50 N). Propylene glycol was added and the mixture was stirred for another 5 min.

4. High Pressure Homogenization (Emulsification)
    High pressure two stages homogenization was carried out (APV homogenizer Lab 100, 2 passes $3 \times 10^7$ Pa: pressure ratio first stage/second stage=$2.5 \times 10^7$ Pa/$0.5 \times 10^7$ Pa).

Characterization of the Emulsion:
    Average oil droplet size: the average surface/volume oil droplet size (also called $d_{(3,2)}$ or Sauter diameter) was measured (when feasible) immediately after homogenization by laser light scattering technique (Malvern MasterSizer MS17, Malvern Instruments).

Aspect: visual aspect was assessed both before and after high-pressure homogenization.

TABLE 1

| Pectin commercial name | GENU beta pectin | UNIPECTINE AMP 605 | UNIPECTINE AMP 285 C |
|---|---|---|---|
| Supplier | Hercules | Degussa | Degussa |
| Pectin type | HM | LM amidated | LM amidated |
| Source | Sugar beet pulp | Apple pomace | Citrus peel |
| DE (%) | c.a. 55 | 26 to 30 | 22 to 27 |
| pH | Not specified | 4.2 to 5 | 4.4 to 5 |
| Aspect before homogenization | Liquid low viscosity | Thick liquid | Very thick liquid |
| Aspect after homogenization | Liquid low viscosity | Very thick liquid | Gel |
| Average droplet size (µm) | 0.55 | Not measurable (gelled) | Not measurable (gelled) |

From the above results, it appears that the two amidated LM pectins tested were not suitable to stabilize acidic butter oil-in-water flavored emulsions. In fact, both types of LM pectins formed a gel.

Example 3

Preparation of a Liquid Acidic Dairy Flavored Butter Oil-in-Water Emulsion

Composition of the Emulsion:

| Ingredients | Parts by weight |
|---|---|
| Butter oil | 7.50 |
| Mouthfeel enhancer[1] | 2.00 |
| Vitamin E | 0.04 |
| Dairy flavor 504922 T[2] | 0.04 |
| Water | 68.17 |
| Whey powder[3] | 3.00 |
| HM pectin[4] | 1.75 |
| Ethyl alcohol | 15.00 |
| Propylene glycol | 2.50 |
| Total | 100.00 |

[1] butter hydrolysate; origin: Firmenich SA, Geneva, Switzerland
[2] origin: Firmenich SA, Geneva, Switzerland
[3] origin: France Lactosérum
[4] origin: Hercules Processing of the Emulsion:

1. Preparation of the Oil Phase
   The butter oil and mouthfeel enhancer were melted in a water bath at 50°, then mixed with the dairy flavor and vitamin E. This oil was kept melted at 50° before pre-emulsification.

2. Preparation of the Water Phase
   On the other hand, a preblend of HM pectin and whey powder was prepared. The obtained powder was then dispersed in water and stirred using an Ultra-Turax apparatus (T50 basic, speed 3, mixing tool S 50 N, room temperature, 15 min) before being hydrated during 15 min without stirring.

3. Pre-Emulsification (Premixing)
   The oil phase was added to the water phase and stirred for 5 min under an Ultra-Turax apparatus (T50 basic, speed 3, mixing tool S 50 N).
   Propylene glycol and ethylene glycol were added and the mixture was stirred for another 5 min.

4. High Pressure Homogenization (Emulsification)
   High pressure two stages homogenization was carried out (APV homogenizer Lab 100, 2 passes $3 \times 10^7$ Pa: pressure ratio first stage/second stage=$2.5 \times 10^7$ Pa /$0.5 \times 10^7$ Pa).

Characterization of the Emulsion:

Average oil droplet size: average surface/volume oil droplet size (also called $d_{(3,2)}$ or Sauter diameter) was measured immediately after homogenization by laser light scattering technique (Malvern MasterSizer MS17, Malvern Instruments): see Table 2 below.

Viscosity: after homogenization, the emulsion had an absolute viscosity of 130 mPa.s (Viscosimeter AR 100, room temperature, 50 rad/s).

Stability: Oil droplet sizing was performed over 9 months time on a sample kept at room temperature. Table 2 below reports three characteristic parameters of droplet size distribution curves.

TABLE 2

| Storage time | $d_{(3,2)}$ (µm) | $d_{(V,0.1)}$ (µm)[1] | $d_{(V,0.9)}$ (µm)[2] |
|---|---|---|---|
| 0 | 0.55 | 0.35 | 0.98 |
| 3 days | 0.55 | 0.34 | 1.01 |
| 1 month | 0.54 | 0.33 | 1.05 |
| 2 months | 0.54 | 0.32 | 1.12 |
| 3 months | 0.53 | 0.31 | 1.14 |
| 9 months | 0.54 | 0.32 | 1.05 |

[1] 10% of droplet size population is smaller than $d_{(V,0.1)}$
[2] 10% of droplet size population is larger than $d_{(V,0.9)}$ No significant change in droplet size distribution occurred during the 9 months storage period.

EXAMPLE 4

Preparation of a Liquid Acidic Apricot Flavored Butter Oil-in-Water Emulsion Containing an Oil-Soluble Colorant Composition of the Emulsion:

| Ingredients | Parts by weight |
|---|---|
| Butter oil | 8.00 |
| Mouthfeel Enhancer[1] | 1.00 |
| Apricot flavor 504027 AH[2] | 3.00 |
| Vitamin E | 0.05 |
| Apocarotenal[3] | 0.10 |
| Water | 66.60 |
| Whey powder[4] | 2.20 |
| HM pectin[5] | 3.00 |
| Trisodium citrate | 0.70 |
| Water-soluble (WS) carotene | 0.35 |
| Ethyl alcohol | 15.00 |
| Total | 100.00 |

[1] butter hydrolysate; origin: Firmenich SA, Geneva, Switzerland
[2] origin: Firmenich SA, Geneva, Switzerland
[3] (2E,4E,6E,8E,10E,12E,14E,16E)-2,6,11,15-tetramethyl-17-(2,6,6-trimethyl-1-cyclohexen-1-yl)-2,4,6,8,10,12,14,16-heptadecaoctaenal; origin: BASF
[4] origin: France Lactosérum
[5] origin: Hercules Processing of the Emulsion:

1. Preparation of the Oil Phase

The butter oil and mouthfeel enhancer were melted in a water bath at 50° and then mixed with other oil-soluble liquid compounds (vitamin E, apocarotinal and apricot flavor). This oil phase was kept melted at 50° C. before pre-emulsification.

2. Preparation of the Water Phase

On the other hand, a preblend of HM pectin, whey powder and trisodium citrate was prepared. The obtained powder was then dispersed in water and stirred using an Ultra-Turax apparatus (T50 basic, speed 3, mixing tool S 50 N, room temperature, 15 min) before being hydrated during 15 min without stirring.

3. Pre-Emulsification (Premixing)

The oil phase was added to the water phase and stirred for 5 min under an Ultra-Turax apparatus (T50 basic, speed 3, mixing tool S 50 N).

Propylene glycol and WS-carotene were added and the mixture was stirred for another 5 min.

4. High Pressure Homogenization (Emulsification)

High pressure two stages homogenization was carried out (APV homogenizer Lab 100, 1 pass $3 \times 10^7$ Pa: pressure ratio first stage/second stage=$2.5 \times 10^7$ Pa/$0.5 \times 10^7$ Pa).

Characterization of the Emulsion:

Average oil droplet size: the average surface/volume oil droplet size (also called $d_{(3,2)}$ or Sauter diameter) measured immediately after homogenization by laser light scattering technique (Malvern MasterSizer MS17, Malvern Instruments) was found to be 1.10 µm.

Viscosity: after homogenization, the emulsion had an absolute viscosity of 150 mPa.s (Viscosimeter AR 100, room temperature, 50 rad/s).

Aspect: no phase separation and no "oiling-ring" (phase separation of oil-soluble colorant apocarotenal) was observed after 6 months at room temperature

EXAMPLE 5

Preparation of a Liquid Acidic Biscuit Flavored Butter Oil-in-Water Emulsion and Post-Processing this Emulsion into a Powder Form Composition of the Liquid Biscuit Emulsion:

| Ingredients | Parts by weight |
| --- | --- |
| Butter oil | 10.00 |
| Biscuit flavor 714820 26TH[1] | 4.00 |
| Water | 67.30 |
| Whey powder[2] | 2.50 |
| HM pectin[3] | 1.20 |
| Propylene glycol | 15.00 |
| Total | 100.00 |

[1] origin: Firmenich SA, Geneva, Switzerland
[2] origin: France Lactosérum
[3] origin: Hercules Processing of the Liquid Emulsion:

1. Preparation of the Oil Phase

The butter oil was melted in a water bath at 50° and then mixed with the biscuit flavor and kept melted at 50° before pre-emulsification.

2. Preparation of the Water Phase

On the other hand, a preblend of HM pectin and whey powder was prepared. The obtained powder was then dispersed in water and stirred using an Ultra-Turax apparatus (T50 basic, speed 3, mixing tool S 50 N, room temperature, 15 min) before being hydrated during 15 min without stirring.

3. Pre-Emulsification (Premixing)

The oil phase was added to the water phase and stirred for 5 min under an Ultra-Turax apparatus (T50 basic, speed 3, mixing tool S 50 N).

Propylene glycol was added and the mixture was stirred for another 5 min.

4. High Pressure Homogenization (Emulsification)

High pressure two stages homogenization was carried out (APV homogenizer Lab 100, 1 pass $3 \times 10^7$ Pa: pressure ratio first stage/second stage=$2.5 \times 10^7$ Pa/$0.5 \times 10^7$ Pa).

Characterization of the Liquid Biscuit Emulsion:

Average oil droplet size: the average surface/volume oil droplet size (also called $d_{(3,2)}$ or Sauter diameter) measured immediately after homogenization by laser light scattering technique (Malvern MasterSizer MS17, Malvern Instruments) was found to be 0.75 µm.

Viscosity: after homogenization, the emulsion had an absolute viscosity of 110 mPa.s (Viscosimeter AR 100, room temperature, 50 rad/s).

Aspect: no phase separation was observed after 12 months (storage at a temperature 5° C.).

Post Processing of the Biscuit Emulsion:

| Ingredients | Parts by weight |
| --- | --- |
| Biscuit emulsion[1] | 75.0 |
| Maltodextrin 18-20 DE[2] | 22.0 |
| Octenyl succinate starch (Oss)[3] | 3.0 |
| Total | 100.0 |

[1] Prepared as described above
[2] origin: Roquette
[3] origin: National Starch Processing of the Biscuit Emulsion:

1. Premixing

Oss and maltodextrin were blended together and dispersed inside the liquid biscuit emulsion (temperature approx. 50° C.) using a high-shear stirrer (UltraTurrax IKA T25, 1 minute)

2. Spray-Drying

Spray-drying was performed using a single-stage laboratory scale spray-dryer equipped with a two-fluid nozzle (Mini-Büchi B 191, Büchi AG, Switzerland). Liquid emulsion feed (temperature approx. 50° C.) was performed using a peristaltic pump with flow rate adjusted so that outlet temperature of spray-dried emulsion is approx 90° C. (inlet temperature for liquid emulsion inside spray-drying chamber approx 170° C.). There was obtained a free-flowing powder ready to be combined or dry blended with other solid ingredients or powders in a final consumer product.

What is claimed is:

1. A process for the preparation of a dry emulsion for imparting, improving, or modifying the flavor properties of a composition to which it is added, which process comprises dehydrating an oil-in-water emulsion of a lipophilic substance selected from the group consisting of a flavor ingredient or composition, a vegetable fat hydrolysate, an animal fat hydrolysate, and mixtures thereof, the substance being present for imparting, improving or modifying the flavor properties of a composition to which it is added, the emulsion comprising 70 to 95% by weight relative to the total weight of the emulsion of a continuous aqueous phase comprising a combination of high methoxyl pectin and whey protein, and 5 to 30% by weight relative to the total weight of the emulsion of a dispersed phase, wherein the high methoxyl pectin is present in an amount of from 0.10 to 4% by weight relative to the total weight of the emulsion and the whey protein is present in an amount of from 0.2 to 10% by weight relative to the total weight of the emulsion.

2. The process of claim 1, wherein the emulsion is dehydrated by spray-drying.

3. The process of claim 1, wherein the emulsion is dehydrated by subjecting it to an extrusion process.

4. The process of claim 1, wherein, prior to dehydration, the lipophilic substance includes butter oil, the high methoxyl pectin is present in an amount of from 0.25 to 2% by weight relative to the total weight of the emulsion and the whey protein is present in an amount of from 0.5 to 2.5% by weight relative to the total weight of the emulsion and the emulsion is present in an amount effective to impart an acidic butter flavor to the composition.

5. A dry acidic butter oil-in-water emulsion prepared by the process of claim 4.

6. The process of claim 1, wherein the composition is a foodstuff or beverage.

* * * * *